Oct. 19, 1926.  
J. MATTHEWS  
1,604,060  
VEHICLE BRAKE  
Filed June 4, 1923  
4 Sheets-Sheet 1

WITNESSES

INVENTOR  
JESSE MATTHEWS  
BY  
ATTORNEYS

Oct. 19, 1926.
J. MATTHEWS
VEHICLE BRAKE
Filed June 4, 1923 4 Sheets-Sheet 2
1,604,060
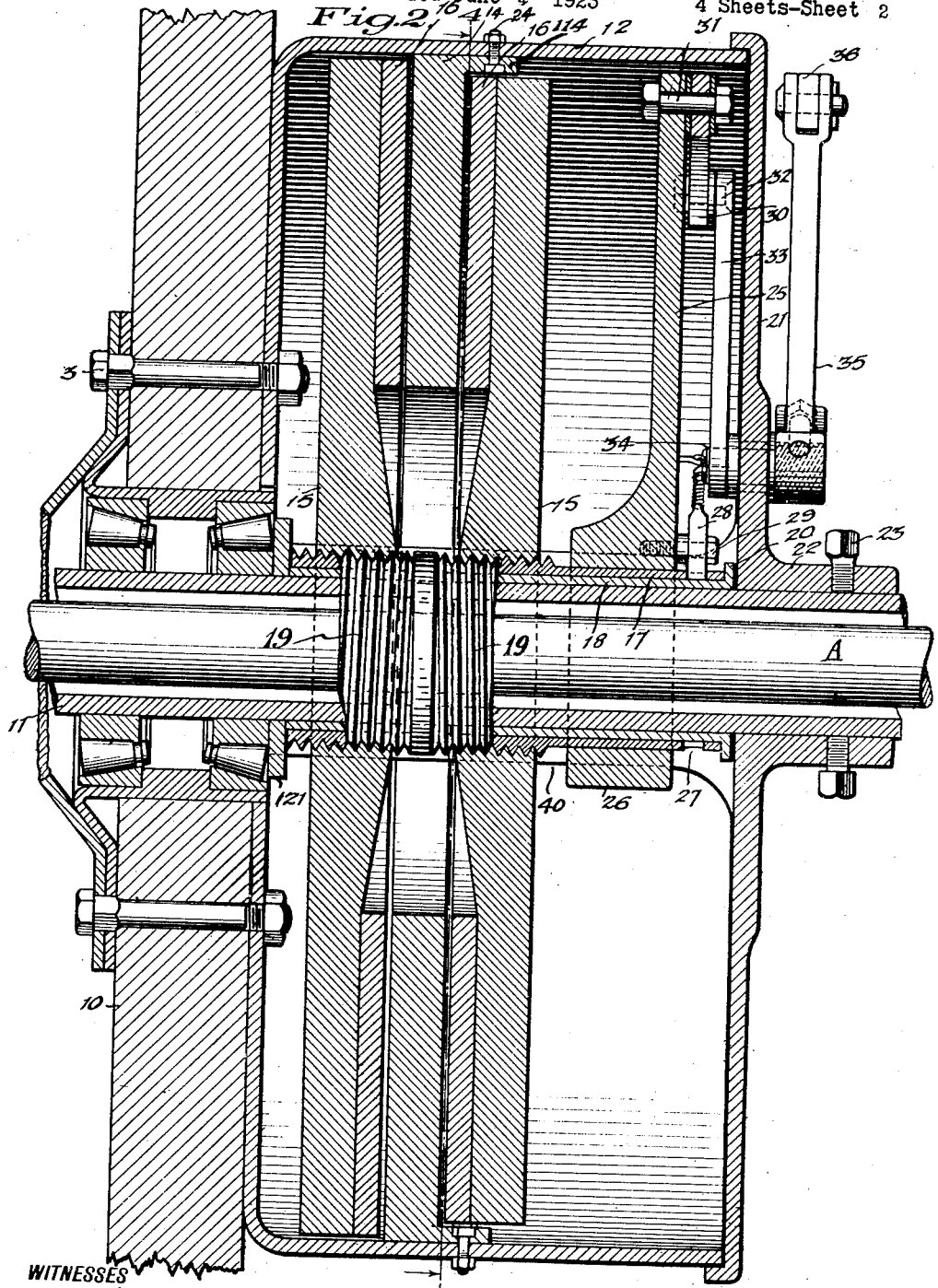
WITNESSES
INVENTOR
JESSE MATTHEWS
BY
ATTORNEYS Oct. 19, 1926.　　　　　　　　　　　　　　　　　　　1,604,060
J. MATTHEWS
VEHICLE BRAKE
Filed June 4, 1923　　　　　　4 Sheets-Sheet 3

WITNESSES

INVENTOR
JESSE MATTHEWS
BY
ATTORNEYS

Oct. 19, 1926.
J. MATTHEWS
1,604,060
VEHICLE BRAKE
Filed June 4, 1923
4 Sheets-Sheet 4
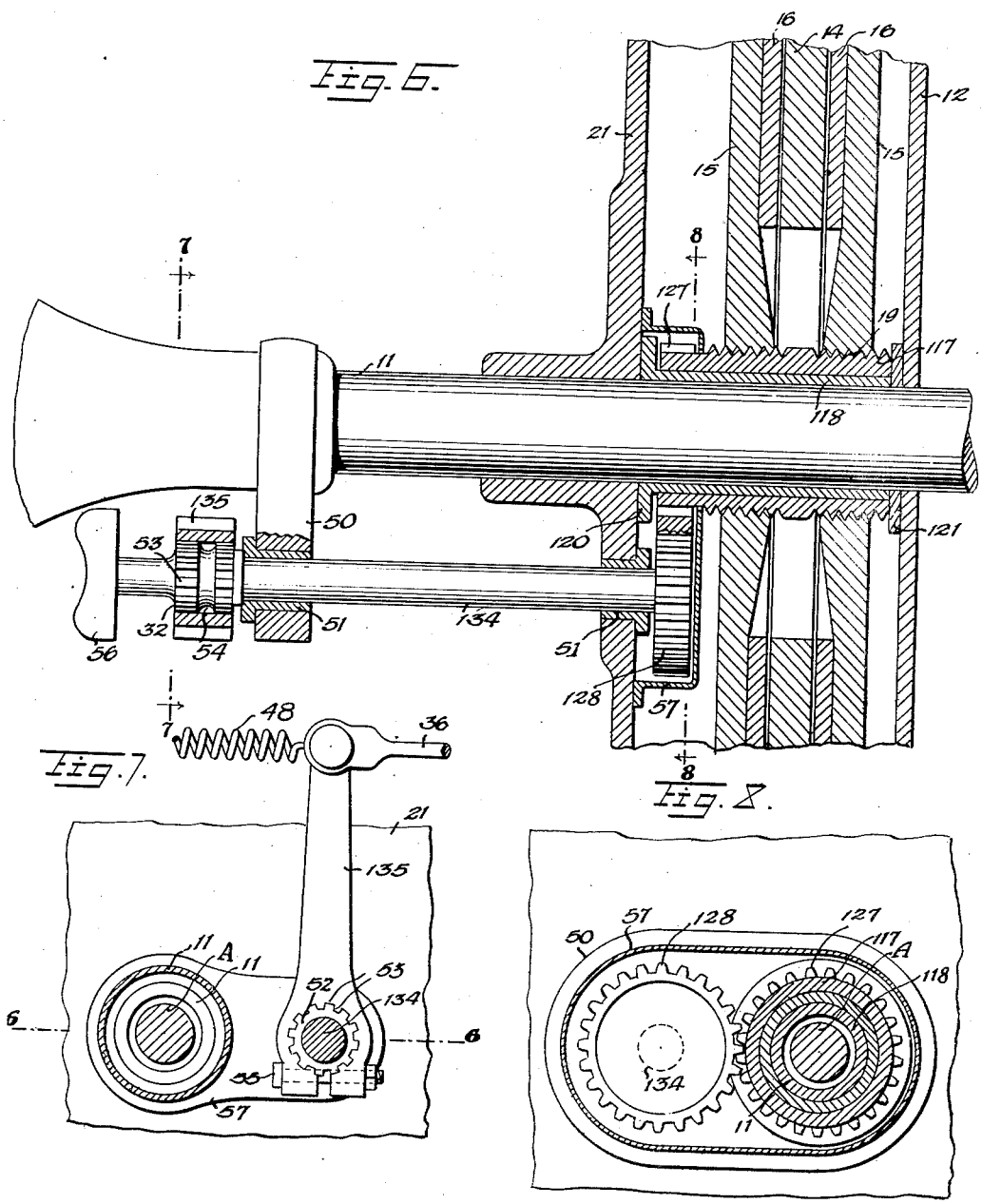
INVENTOR
JESSE MATTHEWS
BY
ATTORNEYS
WITNESSES Patented Oct. 19, 1926.

1,604,060

UNITED STATES PATENT OFFICE.

JESSE MATTHEWS, OF ABSECON, NEW JERSEY.

VEHICLE BRAKE.

Application filed June 4, 1923. Serial No. 643,426.

My invention relates to brake means for vehicles particularly automobiles and more especially relates to a brake of the type in which brake disks are employed adapted to have frictional braking engagement with a revoluble friction element.

The general object of my invention is to provide a brake means of the indicated class efficient to produce an effective braking pressure with a slight expenditure of force.

A more specific object of the invention is to provide a novel brake assemblage reflecting practical considerations with respect to strength and simplicity as well as facility of assemblage and control.

The nature of the invention, its distinguishing features and advantages will clearly appear as the description proceeds.

Reference is to be had to the accompanying drawings forming a part of this specification, it being understood that the drawings are merely illustrative of examples of the invention.

Figure 2 is a longitudinal vertical section as indicated by the line 2—2, Figure 1;

Figure 6 is a view generally similar to Figure 2 but looking from the opposite side of the axle and illustrating a modified brake control and adjusting means, the section of Figure 6 being indicated by the lines 6—6, Fig. 7;

Figure 7 is a cross section as indicated by the line 7—7, Figure 6;

Figure 8 is a cross section as indicated by the line 8—8, Figure 6.

Figure 1:
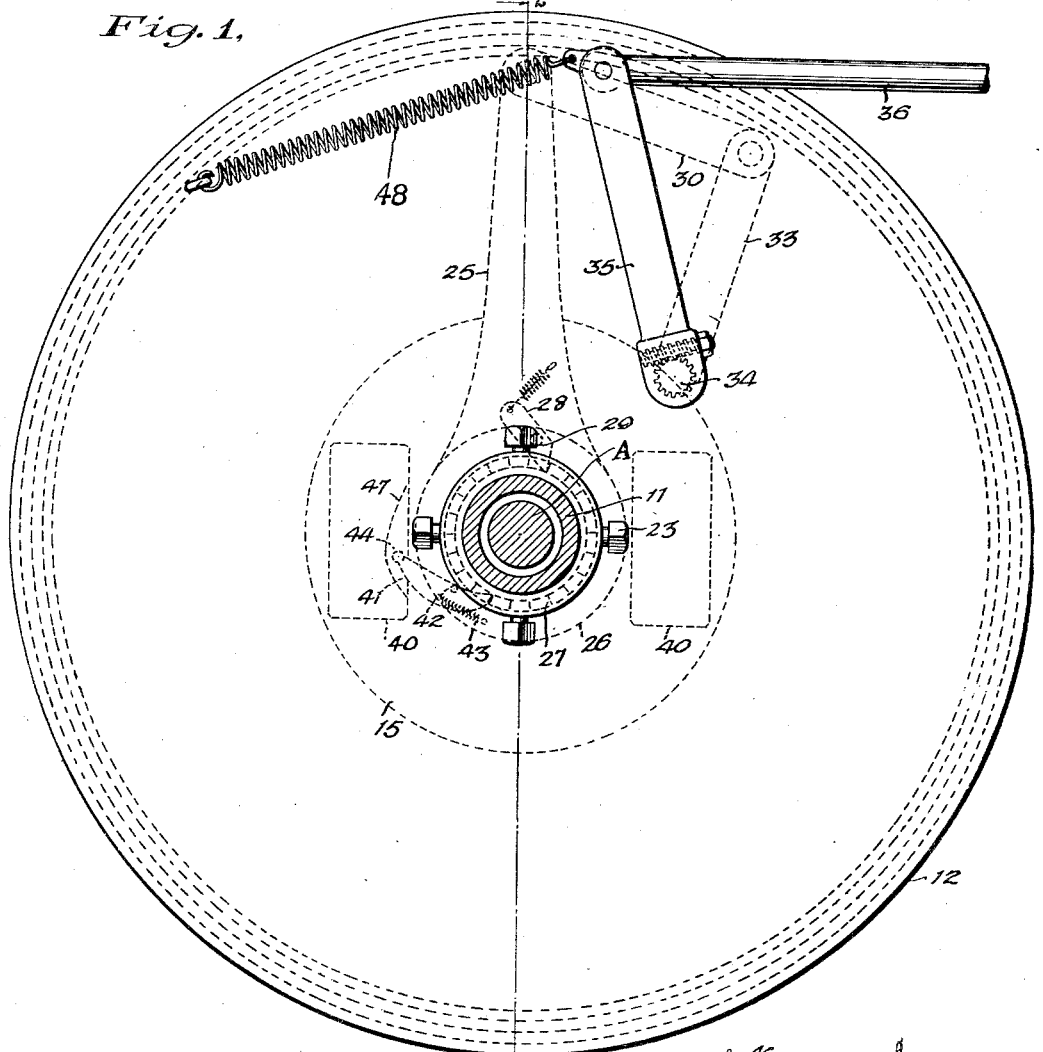
Figure 1 is an end elevation of a brake embodying my invention, showing the rear axle and its housing in cross section.
Figure 3:
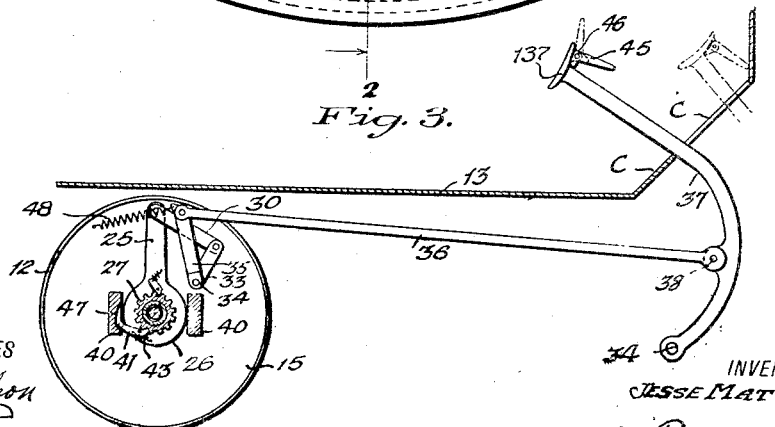
Figure 3 is a view partly in section and partly in elevation, the view being given more particularly to show the brake-operating means.
Figure 4:
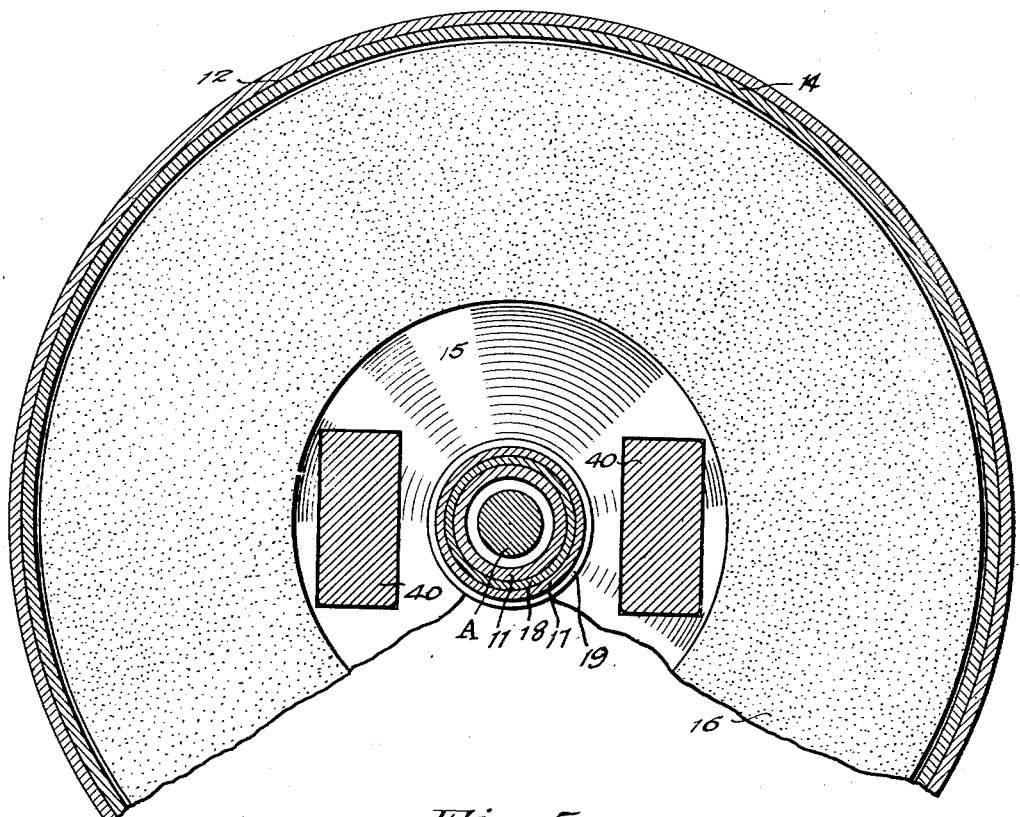
Figure 4 is a transverse vertical section as indicated by the line 4—4, Figure 2.
Figure 5:
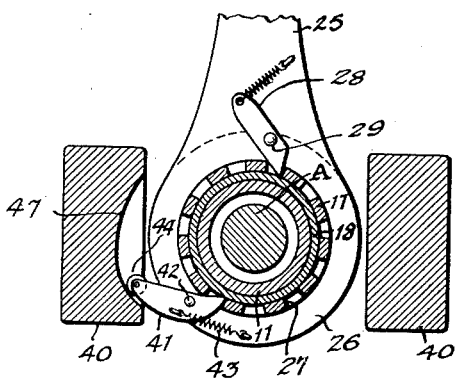
Figure 5 is a detail view in elevation given to show the brake controlling dog.

Referring first to the assemblage shown in Figures 1 to 5 A indicates the axle of an automobile; 10, the rear wheel thereof; and 11, the axle housing. In accordance with my invention I provide a brake case or housing 12 here shown as secured by bolts 13 to the wheel 10. On said housing at the interior is a radially disposed friction disk 14 at each side of which are disposed brake disks 15 having facings 16 and mounted on a sleeve 17 concentric with the axle housing and turning on a bushing 18 which in practice is made of bronze and takes the wear of the sleeve 17. The disks 15 have right and left threaded engagement as at 19 with the sleeve 17. To prevent longitudinal displacement of the sleeve 17 and bushing 18, said bushing is shown at one end as formed with a radial flange 20 lying against the inner face of a cap or closure 21 on the case 12. At the opposite end of the sleeve 17 is a collar 121 on the housing 11. The sleeve 17 abuts at one end against the collar 121 and at the other end against the flange 20 of bushing 18. The cap 21 has a hub 22 secured to housing 11 by set screw 23 or by rivets or other suitable means. To secure the fixed frictional disk 14 to casing 12, I have shown a bolt 24 passing through the housing and through an annular flange 114 on said disk.

A lever 25 has its hub 26 loose on the sleeve 17 and said sleeve has a ratchet 27 formed by producing an annular series of holes in said sleeve. The ratchet 27 is adapted to be engaged by a spring-pressed pawl 28 secured by a bolt 29 to said lever 25. To actuate the brake lever 25 a link 30 is pivoted by a bolt 31 or the like to an end of said lever, the opposite end of said link being pivoted as at 32 to a rocker arm 33 on a short shaft 34. The arm 33 lies at the inner side of the cap 21 within the case 12 and the shaft 34 extends through said cap to the inner side thereof. Attached to the outer end of shaft 34 is a rocker arm 35 secured to a rod 36 adapted to be manually operated by any suitable means as for example by a pedal 37 pivotally connected to said rod as at 38 and fulcrumed as at 39 to any fixed part of the automobile structure below the bottom B thereof. The arrangement is such that the depression of the pedal 37 will rock lever 25 through the medium of the rod 36, arm 35, shaft 34, arm 33 and link 30.

In order that the throwing of the lever 25 and the turning of the sleeve 17 through the pawl 28 and ratchet 27 will cause a movement of the brake disks 15 toward or from the friction element 14, means is provided to prevent the turning of said disks about the axis of the housing 11 and axle A; in the illustrated example use is made of members 40 rigid with the cap 21 and extending parallel with the sleeve 17 at opposite sides thereof. The members 40 pass through the disks 15 and said members 40 being nonturnable said disks are also held against turning. Therefore, when the sleeve 17 is given a turning movement in one or the other direction by the throwing of the lever 25, the disks 15 will be caused to bind against or to disengage the friction element 14 to thus produce a friction action or a releasing movement. A holding dog 41 is pivoted as at 42 to the hub 26 of lever 25 and under the action of a spring 43 tends to engage at one end in the ratchet 27. The opposite end of dog 41 has a roller 44 thereon and the roller end of the dog is adapted to be tripped by an abnormal depression of the brake pedal 37 for tightening the brake. Thus, normally the depression of the brake pedal 37 is limited by a stop member 45 on the head 137 of said pedal and said stop member 45 in the normal depression of the pedal 37 is adapted to contact with the foot board C at opposite sides of the slots c through which the pedal operates. The member 45 is pivoted as at 46 and may be thrown away from its normal position to permit an abnormal depression of the pedal 37 to thereby give an increased amplitude of movement to the lever 25 under which circumstances the dog 41 is tripped by engagement of the roller 44 with a cam surface provided for the purpose. In the illustrated example the cam surface is indicated as formed at 47 on one of the rigid members 40. Upon release of the foot pedal 37 a spring 48 restores the lever 35 to a position disengaging dog 41 from the cam surface 47 and as the dog 41 is released from engagement with the cam surface 47, the spring 43 will cause engagement of dog 41 with the ratchet 27 of sleeve 17, and the continued movement of lever 25 will thus cause said dog 41 to turn said ratchet 27 and sleeve 17 relatively to the disks 15, in a direction the reverse of the turning movement by the pawl 28, and thereby through the threaded connection 19 releasing said disks from frictional engagement with the revolving friction element 14.

In the form of the invention illustrated in Figures 6 to 8 the same arrangement of revolving friction disk 14 and brake disks 15 is employed, said disks having the mentioned facings 16. Also, the elements indicated by the numerals 11, 12, 19, 21, 36 and 48 are the same as in the first described construction, the letter A indicating the axle as in the other figures.

In carrying out the invention in the form shown in Figures 6 to 8 a sleeve 117 corresponding in general with the sleeve 17 is provided and turning about a bushing 118 having a flange 120 at one end corresponding with the flange 20 and washer 121 at the opposite end. Rigid with the sleeve 117 is a gear wheel 127 meshing with which is a pinion 128 on a shaft 134 so that the turning of said shaft will, through the gears 128 and 127, turn the sleeve 117 so that the threaded connection 19 with the disks 15 will move said disks relatively to the friction disk 14 for adjusting the relation of the disks 15 to the disk 14, whereby to produce the same result as the operation of the pawl 28 and ratchet openings 27 in the first described construction. Said shaft 134 turns in bearings 51 in the cap or closure 21 and in the fixed element 50 on the axle housing 11. A brake lever 135 is secured to the shaft 134 as follows: The shaft 134 has a zone of increased diameter as at 52. On the said zone 52 and at the interior of the bore or eye of the lever 135 are mating teeth 53 parallel with the shaft 134 so that the lever may be slid longitudinally of the shaft 134 to engage or disengage the mating teeth 53.

An annular groove 54 is formed in the zone 52 and a clamp bolt 55 for tightening the split end of the lever 135 on the shaft 34 enters said groove 54 tangentially to prevent longitudinal displacement of the lever 135 on the shaft 134 after said lever has been adjusted. On the outer end of the shaft 134 is a head or thumb piece 56 for holding said shaft for manipulating the same for effecting an adjustment of the disks 15. Between the head 56 and the enlarged zone 52 of the shaft 134 is a clearance space for permitting movement of lever 135 toward said head 56 in the disengagement of the mating teeth 53. A casing 57 surrounds the gears 127, 128.

If the brake lining has become worn to such an extent that the throw of the brake lever 135 will not be sufficient to bring the disks 15 into braking engagement with revoluble disk 14 the relation of the disks is adjusted as follows:

The bolt 55 is removed to loosen the split end of the lever 135 and permit said lever to be moved longitudinally of the shaft 134 to a position adjacent the head 56 and with the mating teeth 53 thus disengaged. The shaft 134 may now be turned manually by grasping the head 56, thus through the gears 128, 127 turning the sleeve 117 and moving the disks 15 toward the disk 14. Hence, with the relations of the disks 14 and 15 corrected, movement of the brake rod 36 and the throw of the lever 135 in response thereto will give the proper movement to the disks 15 for frictionally engaging the disk 14. After the adjustment of the disks 15 by the manual turning of the shaft 134 the lever 135 is restored to the position at the zone 52 and with the mating teeth 53 in engagement. The bolt 55 then firmly clamps the lever 135 in position on the shaft 134 for the normal operation of the brake in response to the depression of the brake lever.

I would state in conclusion that while the illustrated examples constitute practical embodiments of my invention, I do not limit myself strictly to the exact details herein illustrated, since, manifestly, the same can be considerably varied without departure from the spirit of the invention as defined in the appended claims.

Having thus described my invention, I claim:

1. A braking device of the class described comprising a casing adapted to be mounted on a driven wheel concentric with the axis thereof, a friction element rigid with said casing to revolve with the casing upon rotation of the wheel, friction disks at opposite sides of said friction element, a sleeve concentric with said casing, a right and left threaded connection between said sleeve and the respective disks, and means to actuate said sleeve in opposite directions for causing movements of the disks toward or from said friction element.

2. A brake of the class described including a revoluble friction element, a brake disk adjacent said element, a turnable sleeve on which said brake disk is threaded, a gear wheel rigid with said sleeve, a gear wheel meshing with the first gear wheel, a shaft on which the second gear wheel is fixed, a brake lever mounted on said shaft, and means to hold said brake lever rigid on the shaft to permit of longitudinal movement of said brake lever for adjusting the angular position of the lever on the shaft.

3. A brake of the class described including a revoluble friction element, a brake disk adjacent said element, a sleeve on which said brake disk is threaded, a brake lever, a shaft on which said lever is mounted, means to secure the brake lever to the shaft or to release the lever for permitting longitudinal displacement of the lever for independent turning of the shaft, and means to actuate said sleeve by turning said shaft.

4. A brake of the class described including a revoluble friction element, a brake disk adjacent said element, a sleeve on which said disk is threaded, a drive shaft, a drive connection between said shaft and said sleeve for turning the latter to cause movement of the brake disk toward or from said revoluble element, a brake lever on the shaft, coacting members on the shaft and on the brake lever to effect engagement therebetween, said brake lever being movable longitudinally on the shaft when disengaged from the same to permit independent turning of the shaft, and a head on the shaft adapted to be grasped for turning the shaft, said brake lever being disengageable from the shaft by a movement toward said head.

JESSE MATTHEWS.